(12) United States Patent
Gil et al.

(10) Patent No.: US 8,134,740 B2
(45) Date of Patent: *Mar. 13, 2012

(54) SPOT COLOR CONTROLS AND METHOD

(75) Inventors: Alvaro E. Gil, Rochester, NY (US);
Lalit K. Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1605 days.

This patent is subject to a terminal disclaimer.

(21) Appl. No.: 11/507,406

(22) Filed: Aug. 21, 2006

(65) Prior Publication Data

US 2008/0043264 A1 Feb. 21, 2008

(51) Int. Cl.
*G06F 15/00* (2006.01)
*G06K 1/00* (2006.01)

(52) U.S. Cl. .................. 358/1.9; 358/504; 358/518

(58) Field of Classification Search ........... 358/500–540
See application file for complete search history.

(56) References Cited

U.S. PATENT DOCUMENTS

| | | | |
|---|---|---|---|
| 5,452,094 A | 9/1995 | Ebner et al. | |
| 5,809,213 A | 9/1998 | Bhattacharjya | |
| 6,043,909 A | 3/2000 | Holub | |
| 6,072,589 A | 6/2000 | Rozzi | |
| 6,157,469 A | 12/2000 | Mestha | |
| 6,157,735 A | 12/2000 | Holub | |
| 6,178,007 B1 | 1/2001 | Harrington | |
| 6,222,648 B1 | 4/2001 | Wolf et al. | |
| 6,344,902 B1 | 2/2002 | Duke et al. | |
| 6,456,395 B1 | 9/2002 | Ringness | |
| 6,636,628 B1 | 10/2003 | Wang et al. | |
| 6,744,531 B1* | 6/2004 | Mestha et al. | 358/1.9 |
| 6,809,837 B1 | 10/2004 | Mestha et al. | |
| 6,934,053 B1 | 8/2005 | Mestha et al. | |
| 7,034,960 B2 | 4/2006 | Stone et al. | |
| 7,069,164 B2 | 6/2006 | Viturro et al. | |
| 7,072,084 B2 | 7/2006 | Shirasawa | |
| 7,480,070 B2 | 1/2009 | Falk | |
| 2002/0093684 A1 | 7/2002 | Bares et al. | |
| 2004/0141193 A1* | 7/2004 | Mestha | 358/1.9 |
| 2005/0030560 A1 | 2/2005 | Maltz et al. | |
| 2005/0071104 A1 | 3/2005 | Viturro et al. | |
| 2006/0285135 A1* | 12/2006 | Mestha et al. | 358/1.9 |
| 2008/0043263 A1* | 2/2008 | Hancock et al. | 358/1.9 |

* cited by examiner

*Primary Examiner* — Benny Tieu
*Assistant Examiner* — Michael Tzeng
(74) *Attorney, Agent, or Firm* — Pillsbury Winthrop Shaw Pittman LLP

(57) ABSTRACT

A method of color management for image marking devices utilizes an automated spot color editor having a control module accessing a graphical user interface. The method includes receiving image data input, in either device-dependent color space or device-independent color space, for a marking job. It is determined whether spot colors are present within the image data input and whether the CMYK values for each of the spot colors present within the image data input are included in the marking device spot color dictionary. Operational parameters for the automated spot color editor are initialized, with operational parameters including the desired performance criteria to be minimized by the automated spot color editor through selection of one or more matrices from a plurality of possible gain matrices to identify new CMYK values. The quality level of the new CMYK values is assessed and new CMYK values are transmitted to image printing device(s).

20 Claims, 6 Drawing Sheets

SPOT COLOR CONTROLS AND METHOD

CROSS-REFERENCE TO RELATED APPLICATIONS

The following co-pending application, U.S. Pat. No. 7,738, 140, filed Aug. 21, 2006, titled "System and Method for Automated Spot Color Editor", is assigned to the same assignee of the present application. The entire disclosure of this co-pending application is totally incorporated herein by reference in its entirety.

BACKGROUND AND SUMMARY

This disclosure relates generally to methods and systems for color management in image/text printing or display systems, and more particularly to a system and method for automatically achieving spot color production through use of a plurality of gain matrices per spot color in determining spot color coordinates.

To meet customer demand, the commercial printing industry requires the capability of producing spot colors accurately and consistently. Spot colors can be defined as a fixed set of colors which may be Pantone® colors, customer logo colors, colors in a customer's proprietary marked patterns, or customer defined colors in the form of an index color table. Spot colors are often used, or can be used, for large background areas, which may be the most color critical portion of a particular page. Consistent color in these areas may determine the difference between success or failure in meeting customer requirements.

A goal of the disclosed system and method is to transform the current production print practice by providing an automated approach to the printing of spot colors. Because imaging can occur over a variety of different printing systems and practiced by a variety of different clients and customers, the colors may not always be consistent or accurate. Existing spot color editors utilize a manual approach to the adjustment of CMYK recipes of spot colors prior to raster image processing (RIPing). For example, the document creator may select a Pantone color for application in specific areas through a user interface on a printing device or computer monitor, such as that available on the Xerox® DocuSP® Controller. The Pantone-provided CMYK recipe for the selected printer is obtained from a look-up table. Prior to RIPing the document in the printer, the operator has the option of entering a spot color editor function and specifying an alternative CMYK recipe to achieve the desired color. The document is then RIPed and then printed using the spot color editor recipes where specified, and Pantone recipes otherwise.

However, the algorithms used in such prior art devices require the use of a pre-calculated single gain matrix per spot color as inputs. Gain matrices are obtained using the printer Jacobian matrix and MIMO pole-placement algorithms. Since these matrices are calculated offline during the printer characterization process, the convergence of spot colors to achieve desired accuracy can vary depending on the machine state. Also, the state feedback design may not perform as well as desired for colors near the boundary and the deltaE2000 convergence criteria cannot be easily defined while selecting proper gain matrices since the prior art design uses the CIELab convergence criteria. The computation of deltaE2000 number provides an improved method for comparing color differences in perceptual space. Therefore, it is highly desired to establish the convergence criteria in such a way that the deltaE2000 value for each color is minimized using the minimum number of algorithm iterations. Consequently, it would be desirable to have an automated system that provides improved color performance through the use of a plurality of gain matrices per spot color in determining spot color coordinates.

All U.S. patents and published U.S. patent applications cited herein are fully incorporated by reference. The following patents or publications are noted:

U.S. Patent Application Publication No. 2002/0093684 to Bares et al. ("Accurate Printing of Proprietary Mark Patterns and Colors") describes a printing system that provides a dictionary of recognizable patterns and defined colors corresponding to proprietary marks and selected colors. The dictionary is linked to a user interface on which a user may designate a location within a document and one or more of the proprietary marks with defined colors from an accessible menu. A processor associates the defined colors with the image at the specified location and generates a printer signal representative of the colors and image. Alternatively, the processor may include a pattern recognizer for identifying recognizable patterns within a document. Those patterns having a likeness to defined patterns within the pattern dictionary can be converted to the defined patterns for display or imaging.

U.S. Pat. No. 6,157,469 to Mestha ("Dynamic Device Independent Image Correction Method and Apparatus") describes a method of controlling color drift between a desired image and an output image as obtained by a marking device and intended to match the desired image. The method includes detecting a current output color in the output image with a color sensing device, determining a difference between the current output color in the output image and a corresponding color in the desired image, and automatically setting a next output color in the output image equal to a corrected color that minimizes the difference between the next output color and the corresponding color in the output image.

U.S. Pat. No. 6,178,007 to Harrington ("Method for Continuous Incremental Color Calibration for Color Document Output Terminals") teaches a method for continuously upgrading the color calibration for an electrophotographic printer using a color transform look up table stored in memory. A single or small number of color patch samples is printed at regular intervals during the use of the printing machine. The color patches are sensed and a determination made as to the difference between the sensed color and the desired color. A corrective color calibration value is determined for the sensed patch and a correction is made for that color in the printer memory. The process is repeated to assure that all of the colors within the gamut of the machine are continuously updated.

U.S. Pat. No. 6,744,531 to Mestha et al. ("Color Adjustment Apparatus and Method") teaches an apparatus for providing consistent output across a plurality of different hard copy output devices which may be included in a system having an image data source and a hard copy output device. The image data source supplies image data to a printable image data adjusting apparatus. The image data supplied may be in a device-dependent color space or a device-independent color space. For image data in a device-dependent color space, the adjusting apparatus first converts the image data into device-independent image data and stores it in memory as target image data. If the image data is already device-independent, the image data are stored in the memory of the adjusting apparatus as target image data. The printable image data adjusting apparatus then uses the target image data to generate printable image data. The hard copy output device uses the printable image data to generate a hard copy image. The hard copy image is then passed within the optical field of a sensor that detects device-independent image data values of the hard copy image. The detected device-independent image data values are then compared against the target image data to generate color adjustment factors. The color adjustment factors are used to produce a hard copy image having detected device-independent image data values that more closely represent the target image data.

U.S. Pat. No. 6,809,837 to Mestha et al. ("On-line Model Prediction and Calibration System for a Dynamically Varying Color Reproduction Device") teaches a method and apparatus for on-line prediction of an analytical model of a dynamically varying color reproduction device. The method includes recursively executing a parameter adjustment algorithm for updating the parameters to the analytical model. Parameter adjustment is computed based upon a measured error signal detected between a sensed signal detected from actual device output and with an insitu sensor, and the analytical model output. The adjustment algorithm is recursively executed until parameter convergence effects a minimal error measurement, at which time the updated parameters are identified as accurate within the selected parametric model.

U.S. Pat. No. 7,069,164 to Viturro et al. ("Method for Calibrating a Marking System to Maintain Color Output Consistency Across Multiple Printers") teaches a method for maintaining consistent color output across printers even when the inline sensors have differences in accuracy due to various technical and environmental factors. A spectrophotometer is used to measure the color quality of printed references. Adjustments are then iteratively made until reference charts of desired color quality are obtained. The printed reference allows one to achieve relatively high system performance by removing sensor inaccuracies. Using the printed reference measured by the inline sensor, control systems of each machine are calibrated. At customer sites and at suitable intervals, a reference document can be read using the inline sensor on a reference machine and any differences from expected values can be calibrated out.

U.S. Patent Application Publication No. 2005/0030560 to Maltz et al. ("Methods and Systems for Controlling Out-of-gamut Memory and Index Colors") describes methods and systems in an image processing device for controlling colors that are located external to a gamut. A plurality of color values can be automatically provided as input to said image processing device, wherein the image processing device is under the control of a particular dimensional order, typically a three-dimensional order, but alternatively can be a two-dimensional order. An operation can then be performed dynamically determining which color value among the plurality of color values has attained a gamut limit. Thereafter, the particular dimensional order can be automatically reduced, providing improved control for colors that are located external to the gamut. The plurality of color values analyzed is generally associated with three colors: cyan, magenta, and yellow.

The disclosed embodiments provide examples of improved solutions to the problems noted in the above Background discussion and the art cited therein. There is shown in these examples an improved method of color management for image marking devices utilizing an automated spot color editor having a control module accessing a graphical user interface. The method includes receiving image data input, in either device-dependent color space or device-independent color space, for a marking job. It is determined whether spot colors are present within the image data input and whether the CMYK values for each of the spot colors present within the image data input are included in the marking device spot color dictionary. Operational parameters for the automated spot color editor are initialized, with operational parameters including the desired performance criteria to be minimized by the automated spot color editor through selection of one or more matrices from a plurality of possible gain matrices to identify new CMYK values. The quality level of the new CMYK values is assessed and the new CMYK values are transmitted to an image printing device(s).

In an alternate embodiment there is disclosed a system for color management in image marking devices. The system includes an automated spot color editor having a control module accessing a graphical user interface. The system receives image data input for a marking job, with the image data in either device-dependent color space or device-independent color space. The system determines whether spot colors are present within the image data input and checks whether the CMYK values for each spot colors present within the image data input are included in the marking device spot color dictionary. The operational parameters for the automated spot color editor are initialized, with the operational parameters including the desired performance criteria to be minimized by the automated spot color editor through selection of one or more gain matrices from a plurality of possible gain matrices. The parameters and selected gain matrix(es) are utilized to identify new CMYK values. The system assesses the quality level of the new CMYK values and transmits the new CMYK values to one or more image printing device(s).

In yet another embodiment there is disclosed a computer-readable storage medium having computer readable program code embodied in the medium which, when the program code is executed by a computer, causes the computer to perform method steps for color management in image marking devices through use of an automated spot color editor having a control module accessing a graphical user interface. The method includes receiving image data input, in either device-dependent color space or device-independent color space, for a marking job. It is determined whether spot colors are present within the image data input and whether the CMYK values for each of the spot colors present within the image data input are included in the marking device spot color dictionary. Operational parameters for the automated spot color editor are initialized, with operational parameters including the desired performance criteria to be minimized by the automated spot color editor through selection of one or more matrices from a plurality of possible gain matrices to identify new CMYK values. The quality level of the new CMYK values is assessed and the new CMYK values are transmitted to an image printing device(s).

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
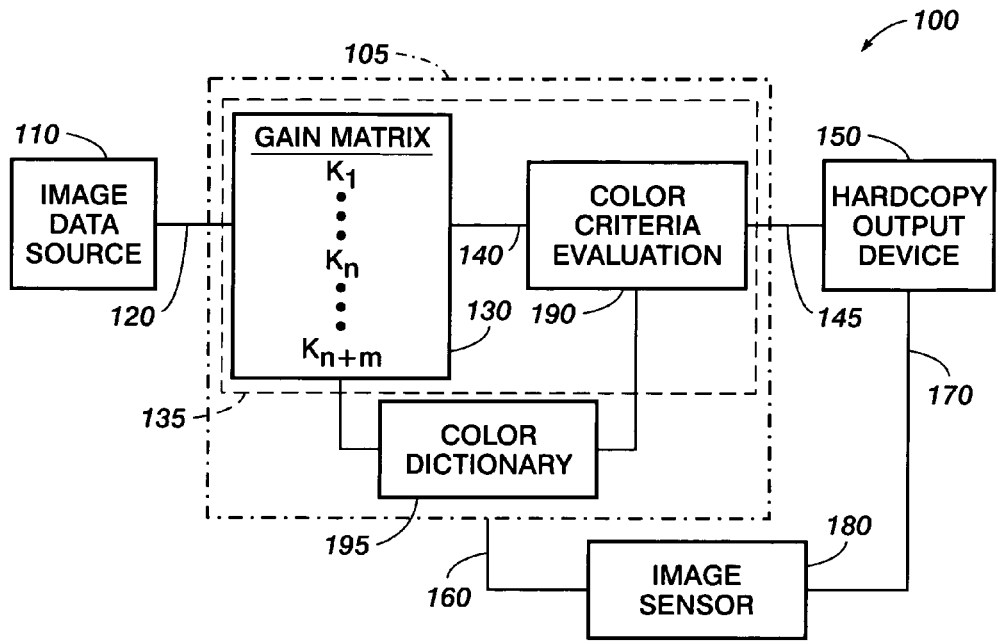
FIG. 1 is a diagram illustrating the structure and functions performed by an example embodiment of a marking device utilizing the model predictive controller within an automated spot color editor.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The automated spot color editor improves upon the existing methods for adjusting or developing CMYK recipes to achieve consistency and accuracy in the print production of spot colors. The methodology used to design "optimal" controllers for the Automated Spot Color Editor is based on the use of the MIMO Model Predictive Controller (MPC). The implementation of the MPC selects, at each iteration of the spot color editor, a gain matrix which is selected from a set of gain matrices within the iteration, which is calculated by minimizing a predetermined performance function comprising of deltaE2000 color differences between named spot color L*a*b* values to the measured spot color L*a*b* values for a preset planning or a predictive horizon. The best gain matrix is selected out of the minimization procedure, which then becomes the gain matrix actively used during iteration. This approach has many advantages when compared to prior art methods.

The predetermined performance function minimized includes (i) the deltaE2000 color-difference values, (ii) the minimization of control energy of the actuators, or (iii) ascertaining the trade-offs between (i) and (ii) at the same time. While for the purposes of brevity and clarity the following description is directed to a cost function associated with deltaE2000 color-difference values, it is noted that other functions known in the art could also be utilized, for example the CIELab equation, all of which are encompassed within the scope of the disclosure and claims herein. By selecting the optimization criterion in (i), the error between the desired color and the measured color is minimized. When the criterion (ii) is used, the error between the desired color and the measured one is still reduced but at the expense of minimizing the control energy used in all the actuators during iteration. The implementation of (iii) seeks to balance the goals established in (i) and (ii). The minimization of the error between the desired color and the measured one as well as the control energy, using the proper gain matrix (controller) in every iteration, results in an "optimal" controller that aims at rapidly tracking the desired color when compared to prior art methods.

The advantages of this approach include (1) Providing the ability to define a better performance (cost) function for minimization. In addition to minimization of deltaE2000 criteria during iteration, the minimization of control energy (i.e., how much of delta CMYK to use during each iteration) may be used in addition to the deltaE2000 criteria.

(2) Providing the ability to set a predictive/planning horizon. In the ASCE algorithm, it is possible to further discretize the computation of gain matrices during each iteration to select the best one suitable for minimizing the performance criteria during the iteration.

(3) Providing the ability to compute the printer Jacobian and hence the gain matrices online, which makes the system more adaptive.

(4) Trade offs between control energy and deltaE2000 criteria can be easily obtained by adjusting weighting factors. This is particularly useful for control of in-gamut spot colors to on-gamut boundary spot colors, since on-gamut boundary spot colors can be set to use minimal control energy without leading to instabilities.

Various computing environments may incorporate capabilities for supporting a network on which the automated spot color editor may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Referring to FIG. 1, there is depicted a functional block diagram of one example embodiment of a print color adjustment system in accordance with the automated spot color editor disclosed herein. It is to be understood that certain aspects of the system would operate in accordance with pre-programmed instructions used to operate a local or networked computer system to carry out such features—perhaps on a plurality of interconnected computers at a time. Such a system might include a commercially available personal computer with appropriate graphics rendering capability that can also be associated with a networked storage medium or similar memory device wherein the system is accessible, perhaps via an Internet or intranet for submission of print jobs. It is also contemplated that one or more aspects of the system may be implemented on a dedicated computer workstation.

As shown in FIG. 1, the color adjustment system 100 is connected to an image data source 110, an Automated Spot Color Adjustment Editor (ASCE) 105, a hard copy output device 150, and an image sensor 180. ASCE 105 includes color dictionary 195 and MIMO Model Predictive Controller (MPC) 135, having gain matrix module 130, and color criteria evaluation module 190. These devices are coupled together via data communication links 120, 140, 145, 160, and 170. These links may be any type of link that permits the transmission of data, such as direct serial connections, a local area network (LAN), wide area network (WAN), an intranet, the Internet, circuit wirings, and the like.

The content for a printing job is initially provided by the customer through an image data source 110 in a form acceptable to the system. The image data source may be a personal computer, a microprocessor, a scanner, a disk drive, a tape drive, a hard disk, zip drive, CD-ROM drive, a DVD drive, a network server, a print server, a copying device, or any other known or later developed device or system that is able to provide the image data. Image data source 110 may include a plurality of components including displays, user interfaces, memory, disk drives, and the like. For simplicity of the following disclosure, it will be assumed that the image data source is a personal computer although, as indicated above, the image data source is not limited to a personal computer.

Hard copy output device 150 may be any type of device that is capable of outputting a hard copy of an image and may take the form of a laser printer, a bubble jet printer, an ink jet printer, a copying machine, or any other known or later developed device or system that is able to generate an image on a recording medium using the image data or data generated from the image data. The hard copy output device 150 generates the hard copy of the image based on printable image data generated by the ASCE.

Image sensor 180 may be any type of device that is capable of detecting image data from a hard copy image and supplying the image data as detected device-independent image data or device dependent image data or post-processed image data, which may be in device-independent or in device-dependent form to the ASCE 105. For example, the image sensor may be an optical sensor, a spectrophotometer, a color sensor, an inline sensor, an off-line sensor, or any other known or later developed device or system that is able to measure the color values of the image data from the hard copy image output by the hard copy output device 150.

Although for the purposes of description ASCE 105 is shown as a separate device from the image data source 110, the ASCE 105 may be an integrated device, such as a digital copier, a computer with a built-in printer, or any other integrated device that is capable of producing a hard copy image output. With such a configuration, for example, the image data source 110, the ASCE 105, the hard copy output device 150, and the sensor 180 may be contained within a single device.

Alternatively, the ASCE 105 may be a separate device containing the ASCE 105 and the sensor 180 attachable downstream of a stand-alone hard copy output device 150. For example, the ASCE 105 and the sensor 180 may be a device which interfaces with both the image data source 110 and one or more hard copy output devices 150, as would be the case if the ASCE 105 is incorporated into a network print server that manages printer data for a plurality of the same or different printing devices.

Furthermore, the ASCE 105 may be implemented as software on the image data source 110 or the hard copy output device 150. The image sensor 180 may be incorporated into the hard copy output device 150 or may exist as a stand alone device that communicates the detected data back to the image data source 110. Other configurations of the elements shown in FIG. 1 may be utilized without departing from the spirit and scope of the specification and claims herein.

The term "image", as used in this disclosure refers to a graphic or plurality of graphics, compilation of text, a contone or haftone pictorial image, or any combination or subcombination thereof, that is capable of being output on a display device, a marker and the like, including a digital representation of such image. For example, an image may be a combination of graphics, text and pictures that is represented by a series of pixel values denoting the color, intensity, etc., of the particular pixels that make up the image. A special subclass of images is images associated with complete documents, which are hereinafter referred to as "document images". Thus an image may be a document image assembled by a customer at the image data source 110, one or more elements of a document image, a "test patch" generated by printing application software or another type of control system, or a member of a collection of images in a database. Image data source 110 provides image data that, when used to display the image or convert the image into a hard copy, provides an approximate representation of the image. The image data source 110 provides the image data to the ASCE 105.

The image data input to the ASCE 105 may be in either a device-dependent color space or a device-independent color space. For example, if the image data source 110 is a personal computer, the image data used for representing the image is typically in the RGB color space, since this is the color space used by a display of the image data source 110. These RGB values may be directly forwarded to the ASCE 105 or may undergo conversion into a device-independent color space, such as L*a*b*, (the Commission Internationale de L'éclairage color standard) prior to being input to the ASCE 105. L* defines lightness, a* corresponds to the red/green value, and b* denotes the amount of yellow/blue, which corresponds to the way the human eye perceives color. A neutral color is a color for which $a^*=b^*=0$.

If the conversion of the device-dependent color space values into device-independent color space values is not performed by the image data source 110 when inputting the image data to ASCE 105, then the ASCE 105 may perform the conversion between the color spaces.

The ASCE 105 transforms the device-independent image data into printable image data based on the color space used by the hard copy output device 150. For example, if the hard copy output device 150 is a printer, the color space used by the printer will often be the CMYK color space. In such a case, the ASCE 105 converts the device-independent image data into CMYK-color space printable image data for the appropriate target value. Alternatively, the target values may be described in any of the color spaces, such as reflectance spectra, L*a*b*, CMYK, RGB, parameters describing color, sRGB, or even the color number, such as a Pantone® number.

Because of various factors, such as environmental conditions, use patterns, the type of media used, variations in media, variations from original models used in initializing the hard copy output device, general wear, and the like, the colors capable of being output by the hard copy output device 150 may not match the desired colors represented by the device-independent image data.

In the ASCE, when a hard copy of the image is output by the hard copy output device 150, the hard copy is placed within the field of detection of the image sensor 180. Image sensor 180 generates image data from the hard copy image and transmits this image data in any of the device independent color coordinate spaces (reflectance spectra, L*a*b*, XYZ, LHC) or in device dependent spaces (CMY, CMYKL, RGB, sRGB) depending on the direct output or transformed output of the sensor image data to the ASCE 105.

Within the ASCE 105, the model predictive controller 135 compares the detected image data values with target image data stored in color dictionary 195. Based on the comparison, adjustment factors are determined that adjust the printable image data to create a revised color recipe for the target value such that the resulting image output by the hard copy output device 150 results in detected image data values that more closely correspond to the target image data. The implementation of the MPC 135 selects, at each iteration of the spot color editor, a gain matrix which is selected from a set of gain matrices 130 within the iteration. The selection is determined by color criteria evaluation module 190, which minimizes a predetermined performance function comparing the deltaE2000 color differences between named spot color L*a*b* values to the measured spot color L*a*b* values for a preset planning or a predictive horizon. The best gain matrix is selected out of the minimization procedure which then becomes the gain matrix actively used during iteration. Operation of the MPC is discussed in more detail with reference to FIGS. 2-4 herein. Alternatively, the ASCE may be utilized to develop new spot colors to meet customer demands and these new spot color recipes are stored in memory.

This process may be repeated a number of times until an amount of error between the detected image data and the target image data falls within an acceptable tolerance. The process may also be restricted to a preset number of iterations. Once the detected image data is within the given tolerances, and/or the maximum number of iterations have been performed, the ASCE 105 provides the hard copy output device 150 with the final set of printable image data usable to output the final image. In this way, the final image will more closely resemble the desired output image regardless of the particular hard copy output device that produces the final image. Thus, if the same image is to be printed by a plurality of different hard copy output devices having different attributes or different printer drifts, substantially the same final image will be produced by each hard copy output device regardless of the different attributes and drifts of each printing device.

The particular methods performed by the ASCE comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 2:
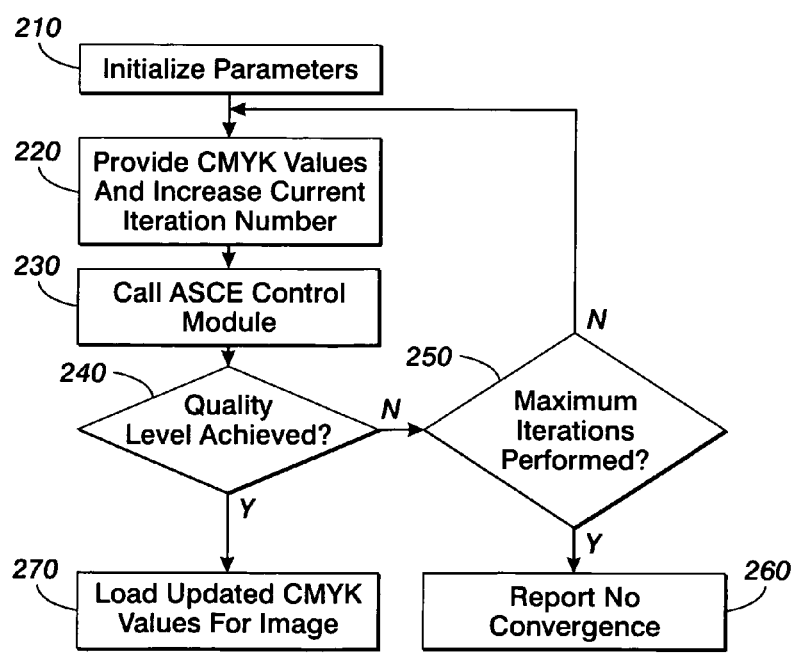
FIG. 2 is a flowchart outlining one exemplary embodiment of the method of operation of the automated spot color editor.

Turning now to FIG. 2, a flowchart illustrates an exemplary embodiment of the method of operation of the automated spot color editor (ASCE). The system begins operation of the ASCE application at 210, with initialization of parameters. The initialized parameters include the current iteration of the ASCE (inum), the desired deltaE2000 (δEtol), and the maximum number of iterations (Iter), of the algorithm. The ASCE module checks the list of spot colors present in the submitted image file against the current printer spot color dictionary. If there are any spot colors on the list that are not included in the printer spot color dictionary, new entries are created in the printer spot color dictionary. This is described more fully in U.S. Pat. No. 7,738,140, filed Aug. 21, 2006, titled "System and Method for Automated Spot Color Editor", fully incorporated by reference hereinabove.

The alternate color space (e.g., reflectance spectra, L*a*b*, RGB, sRGB, parameters describing color or even the color number) of each spot color is used to generate each initial CMYK value. If the alternate color space of a spot color is RGB, L*a*b* color space, the default destination profile for the default halftone is used to create the initial CMYK value for the spot color. If the alternate color space is untagged CMYK, then this CMYK value is used. For the purposes herein, tagging is a method by which CMYK values are organized with some marks so that they can be browsed or processed differently for RIP'ing. Tagging assists in locating the right CMYK for a particular color. The initial CMYK (iCMYK), the iteration number (inum), and the current updated CMYK values (uCMYK), are provided to the ASCE application from the printer graphical user interface at 220.

The ASCE control algorithm is called at 230 and performs a first iteration to generate a printable document of patches using the list of spot colors to be updated. To activate the ASCE function at 230, a software button on the user interface is utilized. The CMYK values for each spot color are obtained at 220 from the printer spot color dictionary and the current iteration number is increased. The spot color patch document is RIP'ed by the printer using no color management for CMYK objects and the default halftone and is printed on the print engine. The spot color document is then read through use of an inline sensor or a spectral sensor and the resulting L*a*b* data is sent to the ASCE module. A determination is made as to whether this is the first iteration of the ASCE module. If this is the first iteration, the ASCE checks for L*a*b* reference values for each spot color on the list. If a reference value exists, it is loaded into the ASCE module. It is then determined if there is a reference L*a*b* for each spot color. If so, the ASCE module checks the measured L*a*b* against the reference L*a*b* for each spot color on the list. If a reference L*a*b* does not exist, the measured L*a*b* is written into the ASCE spot color list as the new reference L*a*b* and a signal is sent to "release" the image file to be RIP'ed and printed at 270. If this is not the first iteration of ASCE, for each spot color the measured L*a*b* is checked against the reference L*a*b*.

The color criterion for the current quality level is checked at 240. If the color criteria (for example dE2000) is met for the quality level selected, then the color is ready to be printed at 270. Otherwise, the module continues iterating if the current iteration is less than the maximum number of iterations (Iter) specified at 210. If the quality level for the desired color is not met with the number of iterations being greater than Iter, then the algorithm fails to generate the desired color. The ASCE module is exited and at 260 a message is presented to the operator on the graphical user interface listing the spot colors that failed the quality level specified by the operator and that the printer spot color dictionary has been updated with the closest match possible for each color.

If the maximum number of iterations has not been exceeded, the ASCE algorithm continues to update the CMYK values for the spot color and the updated CMYK values are written into the printer spot color dictionary. An additional iteration of the ASCE module generates a printable document of patches using the list of spot colors that were just updated and the CMYK values for each spot color as listed in the printer spot color dictionary. As described above, the spot color document is then read through use of an inline sensor or a spectral sensor and the resulting L*a*b* data is sent to the ASCE module. The sequence of checking the measured L*a*b* value against the reference L*a*b* value, assessing whether the quality level was achieved and performing additional iterations is continued until either the color quality criteria has been achieved or the maximum number of iterations has been reached.

Figure 3:
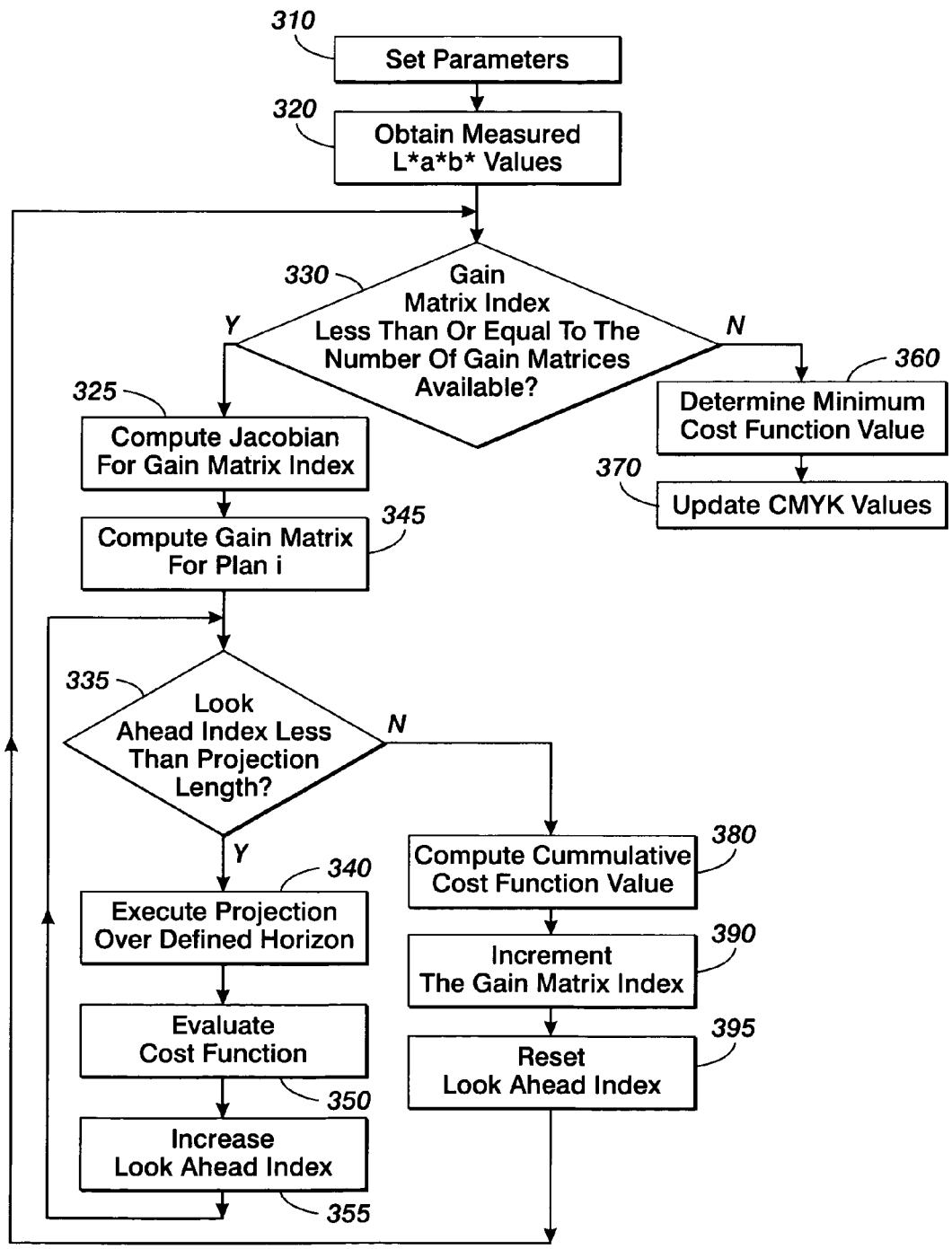
FIG. 3 is a flow chart outlining one exemplary embodiment of the operation of the model predictive controller over one color within the automated spot color editor.

Referring now to FIG. 3, the operation of the model predictive controller (MPC) within the automated spot color editor is illustrated where is shown the process flow for updating the CMYK values of one color. If a set of spot colors is to be considered, then this process must be applied consecutively to each color in the set. The model predictive controller chooses the best gain matrix during each call to the ASCE. All of the parameters to be used during the implementation are set at 310. These include delta CMYK values, $\delta_a, a \in \{1, \ldots m\}$, and poles location, $p_b, b \in \{1, \ldots n\}$, which are used for the calculation of the gain matrix from the printer Jacobian. The projection length, or prediction/planning horizon (the number of iterations planned at a time), N, of the MPC, and the weight parameters, $w_1$ & $w_2$, for the cost function are entered as additional initialization parameters. The measured L*a*b* values are obtained from an inline or offline spectrophotometer by printing a spot color and measuring with the instrument. Also entered is the number of plans or gain matrices available, $N_p$. The first L*a*b* measured values for the spot color before executing any iteration are obtained at 320. Other parameters are internal to the ASCE algorithm. Typical values considered for these initialization parameters are:

TABLE 1

Initialization parameters for ASCE algorithm.

| Target L*a*b* | [79.61 −8.9161 −22.06] |
|---|---|
| δ C/M/Y/K | [0.02 0.07 0.11 0.16 0.20] |
| Poles for C/M/Y/K | [0 0.11 0.23 0.34 0.46 0.57 0.69 0.8] |
| w$_1$ | 1 |
| w$_2$ | 0 |
| N | 10 |

For each iteration, a determination is made at 330 as to whether the current gain matrix index is less than or equal to the number of gain matrices available. If so, the printer Jacobian is computed online at 325 using a stored printer model. Pole locations are assigned during iteration. The gain matrix $K^i(k)$ is computed for each plan i at 345 using the printer's Jacobian and pole locations. It is noted that, for the purposes of this discussion, the multiple gain matrices are determined via MIMO state-feedback controller design. However, any other method known in the art that generates gain matrices for MIMO systems could also be applied in this context, all of which are included within the scope of the disclosure and claims herein. Therefore, the application of MIMO MPC is not limited to the approach presented here. It is noted that when gain matrices are computed "off-line" steps 325 and 345 are not required for the run-time mode. It is then determined whether the look ahead index, the number of iterations planned at a time, is less than the projection length at 335. If the look ahead index is greater than or equal to the projection length, the cumulative cost function value is computed at 380 and the gain matrix index is incremented at 390. The look ahead index is then reset at 395.

If the look ahead index is less than the projection length, the projection is executed over the defined horizon at 340. The projection of the CMYK values is executed for each plan i and the cost function is evaluated at 350 for each plan i. To evaluate the performance of each plan i, the cumulative cost function is defined as $$J(u^i[k, N]) = w_1 \sum_{j=0}^{N-1} (E^i(k+j))^2 + w_2 \sum_{j=0}^{N-1} \|u^i(k, j)\|^2$$

where $E^i(k+j) = \text{deltaE2000}(L^*_{r,k+j} a^*_{r,k+j} b^*_{r,k+j}, y_m^i(k+j))$, with deltaE2000 being the color-difference formula defined by CIE, and $u^i(k,j) = K^i(k) * ([L^*_{r,k+j} a^*_{r,k+j} b^*_{r,k+j}] - y_m^i(k+j))$. $\|a\|$ is the 2-norm of vector a. The tracking error is defined as $e(k+j) = ([L^*_{r,k+j} a^*_{r,k+j} b^*_{r,k+j}] - y(k+j))$. It is assumed that $[L_{r,k+j} a^*_{r,k+j} b^*_{r,k+j}] = [L^*_r, a^*_r, b^*_r]$ for a given spot color and for all k, j, which is the case for the ASCE spot colors. The sequence of control inputs of the $i^{th}$ plan of length N are denoted as $u^i[k,N] = u^i(k,0), u^i(k,1), u^i(k,2), \ldots, u^i(k,N-1)$. Each plan i is formed by a set of control inputs generated by a state-feedback controller computed for a specific pair conformed by the printer Jacobian and the pole locations. The variables $w_1$ and $w_2$ are positive constants that scale both the color-difference formula and the control energy so that those constants could be used to put more emphasis on (i) the color difference, (ii) the control energy of the actuators used to track the color difference, or (iii) achieving a balance between (i) and (ii). The look ahead index is then increased at 355.

If the gain matrix index is not less than or equal to the number of gain matrices available, the minimum cumulative cost function value is determined at 360. Ties are resolved randomly. Finally, the control input is used at 370 to compute the new CMYK values.

The above procedure describes the "on-line (or runtime)" implementation of the MPC method when arbitrary spot color consistency is desired. However, an "off-line" version of this method may also be implemented by pre-computing each gain matrix $K^i$ when fixed known spot color consistency is desired. Notice, however, that both algorithms are applied in real-time. The "off-line" approach might be useful when the mapping CMYK→L*a*b* is linear. If this is not the case, then it is better to compute $K^i$ "on-line." By using the latter approach the CMYK→L*a*b* map for each CMYK value is locally linearized, thus changing the printer Jacobian. This, in turn, could produce a change in the gain matrix $K^i$. However, the delta CMYK and poles location values are not being changed.

Figure 4:
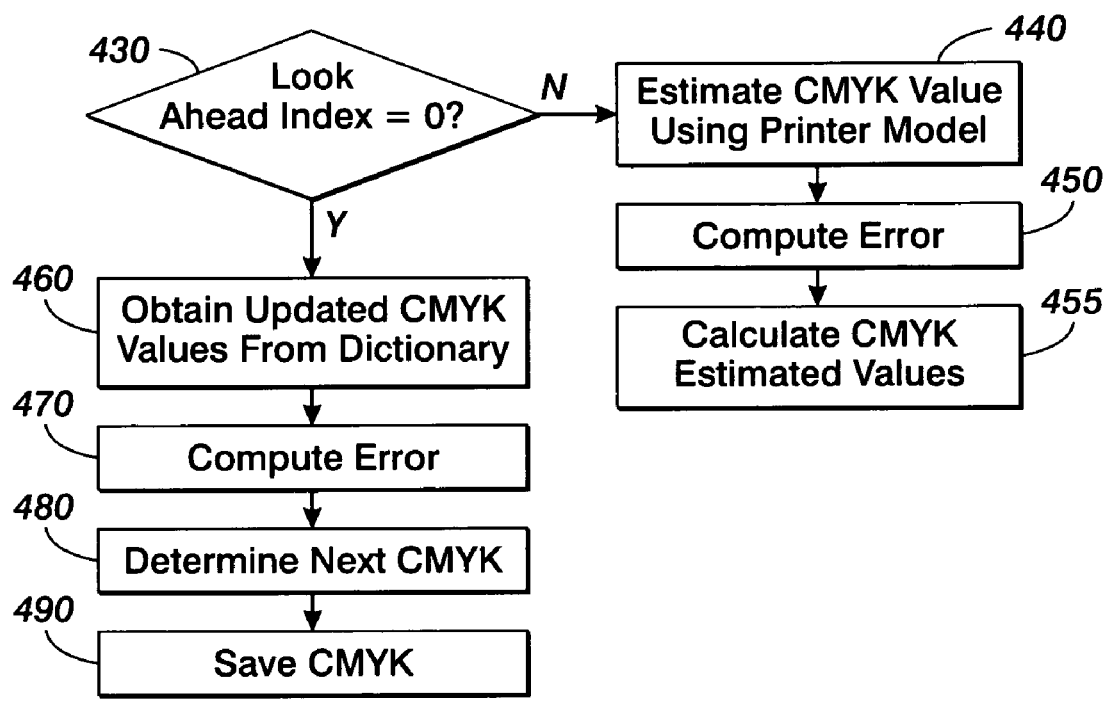
FIG. 4 is a flow chart outlining one exemplary embodiment of estimation of the CMYK values using a planning horizon for the model predictive controller.

Turning now to FIG. 4, execution of the projection is described in more detail. After computation of the printer Jacobian and the gain matrix as described at 325 and 345 above, a determination is made at 430 as to whether the look ahead index j equals 0. If the look ahead index does not equal 0, the L*a*b* values for CMYK are estimated using a printer model, which is a numerical model derived a priori which maps given CMYK values into L*a*b* values to estimate the L*a*b* values (outputs) associated with given CMYK values (inputs). One approach for such mapping is described in U.S. Pat. No. 6,636,628 to Wang et al. ("Iteratively Clustered Interpolation for Geometrical Interpolation of an Irregularly Spaced Multidimensional Color Space"). The error between the target L*a*b* and the printer model is calculated at 450. New calculated CMYK values are then developed at 455 using $$x_m^i(k, j+1) = I \cdot x_m^i(k,j) + K^i(k) e^i(k,j)$$

where $x_m^i(k, j)$ is the $j^{th}$ estimated state values of plan i at time k, $I \in \Re^3$ is the identity matrix, $K^i(k)$ is the $i^{th}$ gain matrix used for the entire current projection, and $e^i(k, j)$ is the $j^{th}$ estimated tracking error of plan i at time k. It is to be noted here that $x_m^i(k,j)$, are the CMYK estimated values. The estimated values are then saved in memory for further use in the next projections.

If the look ahead index j does equal 0, the updated CMYK values are obtained from the spot color dictionary at 460. The error between the target L*a*b* value and the measured L*a*b* value is computed at 470. The next CMYK values are then computed at 480 using $$x_m^i(k, 1) = I \cdot x_m^i(k, 0) + K^i(k) e^i(k, 0)$$

The new CMYK values are then saved in memory for further use in the next projections at 490.

To select the best plan, we compute $$i^* = \underset{i}{\operatorname{argmin}} J(u^i[k, N])$$

at each time k. Then, the control input $u(k)=u^{i*}(k,0)$ is applied to the system (i.e., the first input from the "best" control input).

Figure 5:
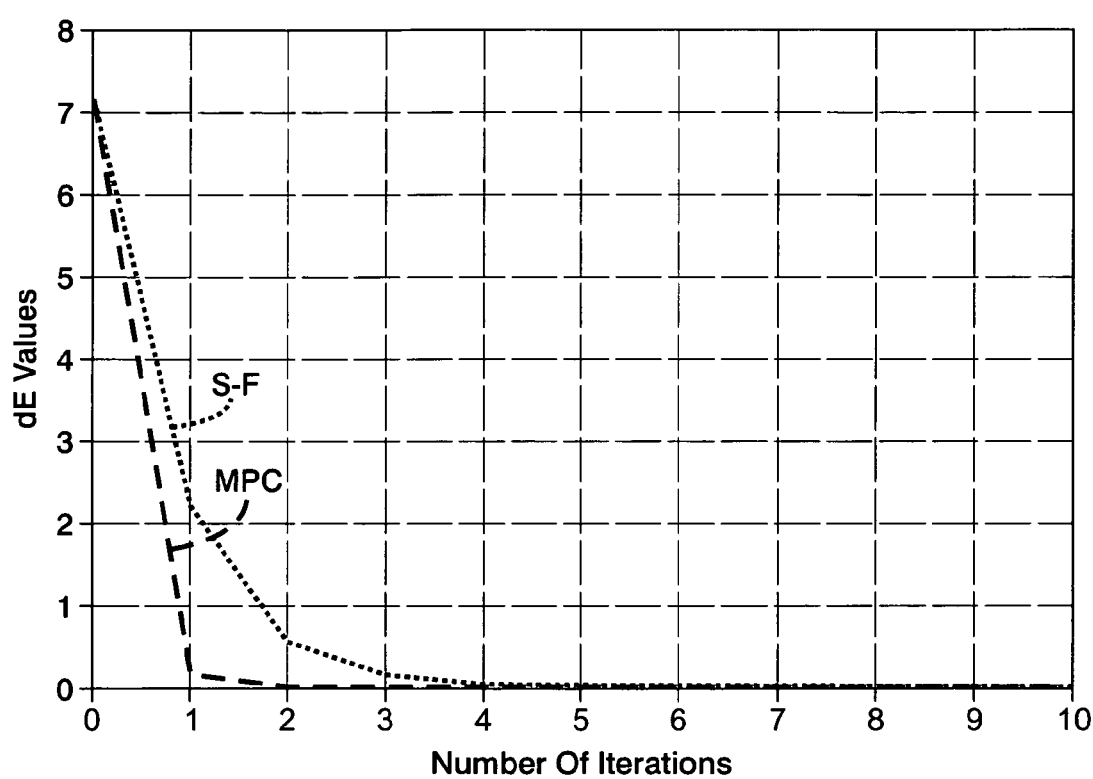
FIG. 5 is a graph comparing the deltaE2000 values typical for a state feedback controller and the values for the model predictive controller.

Referring to FIG. 5, the graph illustrates the performance of a typical prior art device compared to the model predictive controller. For the prior art state feedback controller (S-F), for each color, 1 delta value equals to 0.2 and one pole location equals to 0.3 for the design of the state-feedback controller. These are common values used in the prior art design of this type of controller. For the Model Predictive Controller (MPC), 20 delta values linearly spaced in the range [0.02 0.2] and 25 poles locations linearly spaced in the range [0 0.8] are used. All combinations of the delta values and the poles locations are used to compute both the printer Jacobians and the gain matrices (via pole-placement). The MPC will consider the behavior of 500 controllers (gain matrices) at each time k. Furthermore, the MPC will project the performance of each controller over a horizon of length N. Then, the MPC will choose the control input, u(k), according to the computed preferred plan. The control input computes how much the current CMYK values should be changed in order to try to match the desired spot colors. For the simulations, N=10, $w_1=1$, $w_2=0$ so that only the cost of the color-difference formula is minimized. Also, in this convergence simulation, only MIMO controllers are utilized for CMY values. The deltaE2000 values obtained by the implementation of the above controllers are shown in FIG. 5 and in Table 2. MPC performance surpasses the S-F controller by dynamically selecting for each iteration, the "best" gain matrix from the available gain matrices pool.

TABLE 2 deltaE2000 values obtained by S-F and MPC ($w_1 = 1$, $w_2 = 0$).

| # Iteration | deltaE2000 values for S-F | deltaE2000 values for MPC |
|---|---|---|
| 0 | 7.213 | 7.213 |
| 1 | 2.19 | 0.15 |
| 2 | 0.54 | 2.84e−4 |
| 3 | 0.14 | 4.47e−10 |
| 4 | 0.04 | 1.0287e−014 |
| 5 | 0.012 | 1.69e−15 |
| 6 | 4e−3 | 9.88e−15 |
| 7 | 1.4e−3 | 0 |
| 8 | 5.1e−4 | 0 |
| 9 | 1.83e−4 | 0 |
| 10 | 6.63e−5 | 0 |

Figure 6:
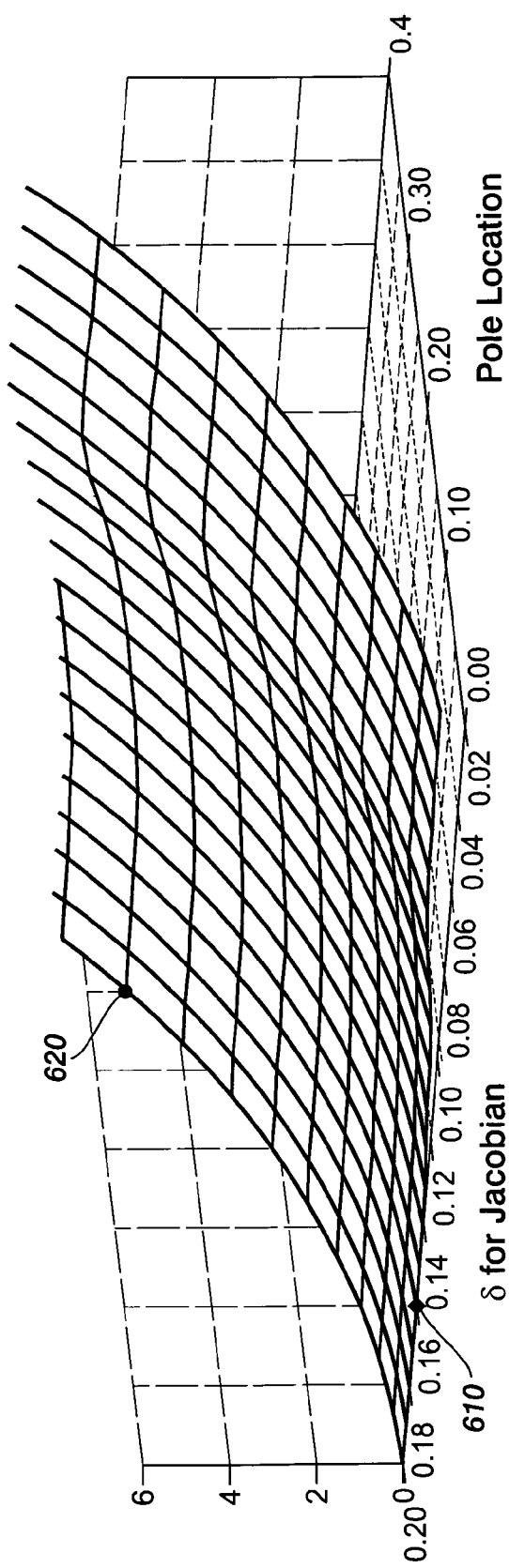
FIG. 6 is a three-dimensional plot showing cost function values for each delta CMY and pole location at the first iteration for a typical state feedback controller and for the model predictive controller.
Figure 7:
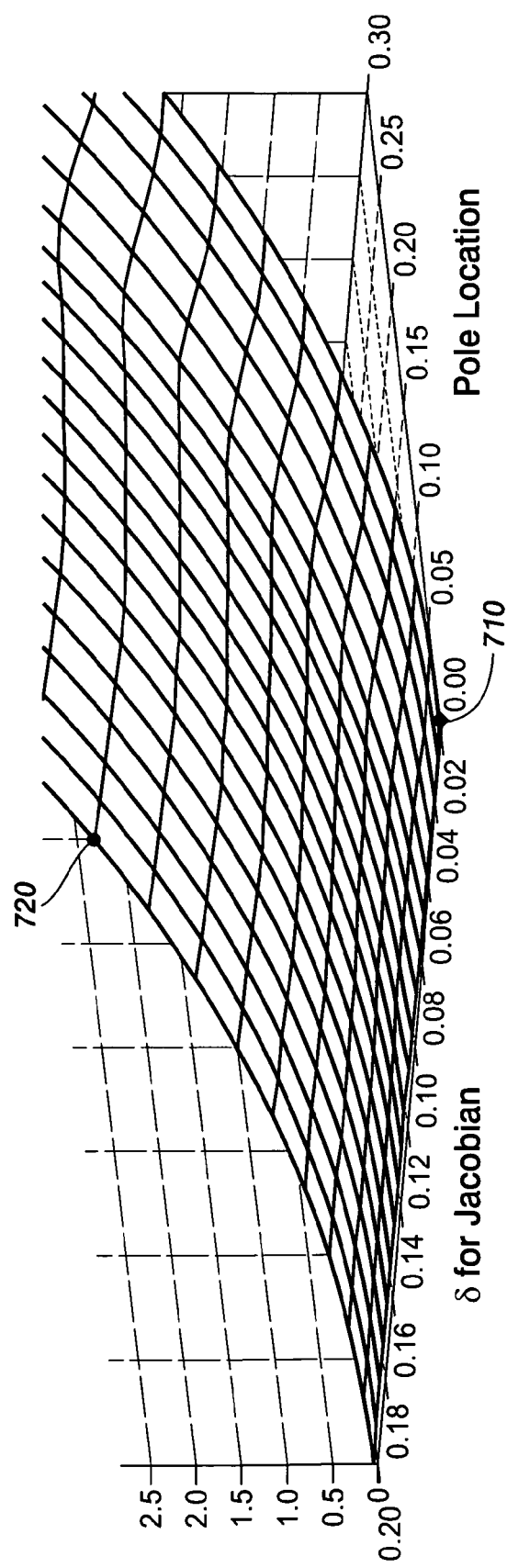
FIG. 7 is a three-dimensional plot showing cost function values for each delta CMY and pole location at the second iteration for a typical state feedback controller and for the model predictive controller.

FIGS. 6 and 7 also provide useful information which can be used to decide the ranges and resolutions for the delta CMYK and poles location values. For instance, if the MIMO MPC method will be used for only the color considered in this case study, then it would be more beneficial to consider less than 20 delta values in the range [0.001 0.18] and less than 25 poles location values within the range [0 0.1]. For controlling colors scattered along the entire gamut, it is probably more convenient to use the delta CMYK and poles location values considered here. Therefore, both the ranges and resolutions of the delta CMYK and poles location values could be conveniently used as design parameters for the colors to be controlled via the MIMO MPC method.

FIG. 6 illustrates the cost function values ($w_1=1$, $w_2=0$) for each delta CMY and pole location at the first iteration. Point 610 at the lower left side of the plot represents the cost for the MPC method whereas point 620 at the upper left side represents the cost for the S-F one. FIG. 7 illustrates the cost function values ($w_1=1$, $w_2=0$) for each delta CMY and pole location at the second iteration. The point 710 at the lower right side of the plot represents the cost for the MPC method whereas the point 720 at the upper left side represents the cost for the S-F one.

While the present discussion has been illustrated and described with reference to specific embodiments, further modification and improvements will occur to those skilled in the art. For example, different cost functions as well as methods to compute multiple gain matrices for MIMO systems could also be used in the implementation of MIMO MPC proposed here. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method of color management for image marking devices through use of an automated spot color editor having a control module accessing a graphical user interface, comprising:
   receiving image data input for a marking job, wherein said image data input is in either device-dependent color space or device-independent color space;
   determining whether spot colors are present within said image data input;
   checking whether CMYK values for each of said spot colors present within said image data input are included in a marking device spot color dictionary;
   initializing operational parameters for the automated spot color editor, wherein said operational parameters include a desired performance criteria to be minimized by the automated spot color editor through selection of at least one of a plurality of possible gain matrices to identify new CMYK values;
   assessing the quality level of said new CMYK values; and
   transmitting said new CMYK values to at least one image printing device.

2. The method according to claim 1, wherein said operational parameters further include the current iteration index of the automated spot color editor and the maximum number of iterations to be performed by the automated spot color editor.

3. The method according to claim 1, further comprising converting said device-dependent color space into device-independent color space.

4. The method according to claim 1, wherein determining the desired CMYK value further comprises generating a printable document of at least one sample patch for said spot colors present within image data.

5. The method according t claim 4, further comprising analyzing the color composition of said at least one sample patch with a color sensing device to develop L*a*b* data and transmitting said L*a*b* data from said color sensing device to the automated spot color editor.

6. The method according to claim 5, further comprising determining whether a first iteration of the automated spot color editor has been performed.

7. The method according to claim 5, further comprising:
determining whether reference L*a*b* values exist for each of said spot colors present within said image data if a first iteration of the automated spot color editor has not been performed;
determining whether a measured L*a*b* value exists for each of said spot colors present within said image data;
comparing said reference L*a*b* values and said measured L*a*b* values for each of said spot colors present within said image data; and
writing said measured L*a*b* value into the memory of the automated spot color editor if said reference L*a*b* value does not exist.

8. The method according to claim 1, wherein assessing the quality level of said new CMYK values determining whether the color criterion is satisfied for the quality level.

9. The method according to claim 1, wherein the automated spot color editor is integrated within the image marking device.

10. A method of color management for image marking devices through use of an automated spot color editor having a control module accessing a graphical user interface, comprising:
receiving image data input for a marking job, wherein said image data input is in either device-dependent color space or device-independent color space;
determining whether spot colors are present within said image data input;
checking whether CMYK values for each of said spot colors present within said image data input are included in a marking device spot color dictionary;
initializing operational parameters for the automated spot color editor, wherein said operational parameters include a desired performance criteria to be minimized by the automated spot color editor through selection of at least one of a plurality of possible gain matrices to identify new CMYK values;
assessing the quality level of said new CMYK values; and
transmitting said new CMYK values to at least one image printing device;
wherein said operational parameters further include the current iteration index of the automated spot color editor and the maximum number of iterations to be performed by the automated spot color editor; and wherein initializing said operational parameters further comprises:
increasing the iteration number; and
determining the desired CMYK value for said iteration comprising:
computing the gain matrix over a defined projection horizon;
evaluating a cumulative cost function, wherein said cost function assesses at least one member selected from the group consisting of the color difference values, the control energy of the actuators used to track the color difference, or a balance between said color difference values and said control energy of said actuators;
determining a minimum value of said cumulative cost function; and
computing new CMYK values.

11. The method according to claim 10, further comprising performing repeated said iterations until said quality level is satisfied or said maximum number of iterations has been performed.

12. The method according to claim 11, further comprising:
indicating on the graphical user interface the identity of spot colors that failed to meet said quality level within said maximum number of iterations; and
updating said spot color dictionary with the closest match possible for each said spot color that failed to meet said quality level within said maximum number if iterations.

13. The method according to claim 11, further comprising updating said spot color dictionary with said new CMYK values which satisfy said quality level.

14. The method according to claim 10, wherein said projection horizon comprises the number of iterations planned for each grain matrix within said plurality of gain matrices, and wherein a look ahead index identifies each said iteration with said projection horizon.

15. The method according to claim 10, wherein selection of said at least one gain matrix comprises:
obtaining measured L*a*b* values;
determining whether a gain matrix index is less than or equal to the number of gain matrices available, wherein said gain matrix identifies the gain matrix being evaluated;
determining a cumulative cost function value and updating said CMYK values if said gain matrix index exceeds the number of said gain matrices available; computing a selected available gain matrix from said gain matrices available;
determining whether the number of iterations performed during a projection is less than said projection horizon;
if said number of iterations performed during said projection is not less than said projection horizon computing said cumulative cost function, incrementing said gain matrix index, resetting said look ahead index, and computing a new selected available gain matrix from said gain matrices available; and
if said number of iterations performed during said projection is less than said projection horizon, executing a projection for the CMYK values over said projection horizon, evaluating said cumulative cost function, and increasing said look ahead index.

16. The method according to claim 15, wherein executing said projection comprises:
determining whether said look ahead index is equal to 0;
if said look ahead index is not equal to zero,
estimating said L*a*b* value using a printer model;
determining the error between desired L*a*b* value from said spot color dictionary and said printer model; and
calculating estimated CMYK values; and
if said look ahead index is equal to zero,
obtaining updated CMYK values from said spot color dictionary;
determining the error between said target L*a*b* value and said measured L*a*b* value;
determining new CMYK values; and
placing said new CMYK values in memory.

17. A system of color management for image marking devices through use of an automated spot color editor having a control module accessing a graphical user interface, comprising:
    means for receiving image data input for a marking job, wherein said image data input is in either device-dependent color space or device-independent color space;
    means for determining whether spot colors are present within said image data input;
    means for checking whether CMYK values for each of said spot colors present within said image data input are included in a marking device spot color dictionary;
    means for initializing operational parameters for the automated spot color editor, wherein said operational parameters include a desired performance criteria to be minimized by the automated spot color editor through selection of at least one of a plurality of possible gain matrices to identify new CMYK values;
    means for assessing the quality level of said new CMYK values; and
    means for transmitting said new CMYK values to at least one image printing device.

18. The system according to claim 17, wherein said operational parameters further include the current iteration index of the automated spot color editor and the maximum number of iterations to be performed by the automated spot color editor.

19. A system of color management for image marking devices through use of an automated spot color editor having a control module accessing a graphical user interface, comprising:
    means for receiving image data input for a marking job, wherein said image data input is in either device-dependent color space or device-independent color space;
    means for determining whether spot colors are present within said image data input;
    means for checking whether CMYK values for each of said spot colors present within said image data input are included in a marking device spot color dictionary;
    means for initializing operational parameters for the automated spot color editor, wherein said operational parameters include a desired performance criteria to be minimized by the automated spot color editor through selection of at least one of a plurality of possible gain matrices to identify new CMYK values;
    means for assessing the quality level of said new CMYK values; and
    means for transmitting said new CMYK values to at least one image printing device,
    wherein said operational parameters further include the current iteration index of the automated spot color editor and the maximum number of iterations to be performed by the automated spot color editor; and wherein selection of said at least one gain matrix comprises:
    obtaining measured L*a*b* values;
    determining whether a gain matrix index is less than or equal to the number of gain matrices available, wherein said gain matrix index identifies the gain matrix being evaluated;
    determining a cumulative cost function value and updating said CMYK values if said gain matrix index exceeds the number of said gain matrices available;
    computing a selected available gain matrix from said gain matrices available;
    determining whether the number of iterations performed during a projection is less than a defined projection horizon;
    if said number of iterations performed during said projection is not less than said projection horizon, computing cumulative cost function, incrementing said gain matrix index, resetting said look ahead index, and computing a new selected available gain matrix from said gain matrices available; and
    if said number of iterations performed during said projection is less than said projection horizon, executing a projection for the CMYK values over said projection horizon, evaluating said cumulative cost function, and increasing said look ahead index.

20. A computer-readable storage medium having computer readable program code embodied in said medium which, when said program code is executed by a computer causes said computer to perform method steps for color management for image marking devices through use of an automated spot color editor having a control module accessing a graphical user interface, comprising:
    receiving image data input for a marking job, wherein said image data input is in either device-dependent color space or device-independent color space;
    determining whether spot colors are present within said image data input;
    checking whether CMYK values for each of said spot colors present within said image data input are included in a marking device spot color dictionary;
    initializing operational parameters for the automated spot color editor, wherein said operational parameters included a desired performance criteria to be minimized by the automated spot color editor through selection of at least one of a plurality of possible gain matrices to identify new CMYK values;
    assessing the quality level of said new CMYK values; and
    transmitting said new CMYK values to at least one image printing device.

* * * * *